Patented Apr. 6, 1954

2,674,626

UNITED STATES PATENT OFFICE 2,674,626

MANUFACTURE OF AMINOACETAL

Serge Tchelitcheff, Vitry-sur-Seine, France, assignor to Societe des Usines Chimiques Rhone-Poulenc, Paris, France, a French body corporate No Drawing. Application September 25, 1952, Serial No. 311,532

Claims priority, application France October 10, 1951

6 Claims. (Cl. 260—584)

This invention relates to the production of aminoacetal i. e. the compound of the formula:

$(C_2H_5O)_2CH—CH_2NH_2$

According to the present invention aminoacetal is prepared by reacting vinyl ethyl ether with ethyl nitrite to produce nitrosoacetal and subjecting said nitrosoacetal to reduction to convert the nitroso grouping to an amino grouping.

The reaction of vinyl ethyl ether and ethyl nitrite takes place simply by addition of the reagents. It may be effected with or without catalysts and preferably at or below room temperature e. g. —20 to +10° C. The vinyl ethyl ether may be employed alone or in a solvent medium e. g. anhydrous diethyl ether.

The nitrosoacetal thus obtained is subjected to reduction by any of the well-known methods of reducing nitroso groups to amino groups, the preferred methods being catalytic hydrogenation in the presence of Raney nickel catalyst and chemical reduction by means of zinc and acetic acid.

The following examples will serve to illustrate the invention but are not to be regarded as limiting it in any way:

Example I

One molecule (72 g.) of vinyl ethyl ether is poured over a period of one hour into one molecule of ethyl nitrite (75 g.) cooled by solid carbon dioxide and containing 1% of the etherate of boron fluoride, the temperature being maintained between 0° and 10° C. The reaction is completed after stirring for one hour. The boron fluoride is eliminated by stirring with an excess of potassium fluoride. The yellow viscous liquid obtained contains 92% of nitrosoacetal, the constants of which in the pure state are B. Pt./10 mm. 99–100° C.; $d_4^{26}$ 1.042; $n_4^{26}$ 1.4331.

The product thus obtained is dissolved in 250 cc. of benzene, and hydrogenated under a pressure of 50–70 kg. per sq. cm. in the presence of 20 g. of Raney nickel. The reaction is completed in 3 hours. After filtering off the nickel, 47.4 g. of aminoacetal are obtained by distillation.

Example II

The crude nitrosoacetal obtained by proceeding as in Example 1 is dissolved in 250 cc. of acetic acid and this solution is run in to a stirred suspension of zinc powder in 250 cc. of absolute ethyl alcohol, maintained below 20° C. When the addition is complete, the mixture is treated with 500 cc. of benzene and the solid is filtered off. The solution is poured into 1000 g. of 50% potassium hydroxide solution and the aqueous layer is extracted three times by 250 cc. of benzene. After distilling off the benzene, 55 g. of aminoacetal are obtained.

I claim:

1. Process for the production of aminoacetal which comprises reacting vinyl ethyl ether with ethyl nitrite and reducing the product by catalytic hydrogenation in the presence of Raney nickel catalyst.

2. Process for the production of aminoacetal which comprises reacting vinyl ether with ethyl nitrite at —20 to +10° C. and reducing the product by catalytic hydrogenation in the presence of Raney nickel catalyst.

3. Process for the production of aminoacetal which comprises reacting vinyl ethyl ether with ethyl nitrite at —20 to +10° C. in the presence of boron fluoride as catalyst and reducing the product by catalytic hydrogenation in the presence of Raney nickel catalyst.

4. Process for the production of aminoacetal which comprises reacting vinyl ethyl ether with ethyl nitrite and reducing the product by treatment with zinc and acetic acid.

5. Process for the production of aminoacetal which comprises reacting vinyl ethyl ether with ethyl nitrite at —20 to +10° C. and reducing the product by treatment with zinc and acetic acid.

6. Process for the production of aminoacetal which comprises reacting vinyl ethyl ether with ethyl nitrite at —20 to +10° C. in the presence of boron fluoride as catalyst and reducing the product by treatment with zinc and acetic acid.

SERGE TCHELITCHEFF

No references cited.